US008768105B2

(12) United States Patent
Luo et al.

(10) Patent No.: US 8,768,105 B2
(45) Date of Patent: Jul. 1, 2014

(54) METHOD FOR SEARCHING A DATABASE USING QUERY IMAGES AND AN IMAGE ANCHOR GRAPH-BASED RANKING ALGORITHM

(75) Inventors: Jiebo Luo, Pittsford, NY (US); Wei Liu, New York, NY (US)

(73) Assignee: Kodak Alaris Inc., Rochester, NY (US)

( * ) Notice: Subject to any disclaimer, the term of this patent is extended or adjusted under 35 U.S.C. 154(b) by 558 days.

(21) Appl. No.: 13/010,807

(22) Filed: Jan. 21, 2011

(65) Prior Publication Data

US 2012/0189211 A1  Jul. 26, 2012

(51) Int. Cl.
*G06K 9/60* (2006.01)

(52) U.S. Cl.
USPC .......... 382/305; 382/190; 382/224; 382/225; 382/218

(58) Field of Classification Search
None
See application file for complete search history.

(56) References Cited

U.S. PATENT DOCUMENTS

| | | | |
|---|---|---|---|
| 6,347,313 B1 * | 2/2002 | Ma et al. ....................... 707/711 |
| 7,466,861 B2 * | 12/2008 | Katoh et al. .................. 382/225 |
| 7,555,476 B2 * | 6/2009 | Holbrook ............................. 1/1 |
| 7,761,466 B1 * | 7/2010 | Eshghi .......................... 707/772 |
| 8,010,544 B2 * | 8/2011 | Tiyyagura ..................... 707/758 |
| 2005/0071310 A1 * | 3/2005 | Eiron et al. ........................ 707/1 |
| 2007/0115373 A1 * | 5/2007 | Gallagher et al. ......... 348/231.3 |
| 2007/0239694 A1 * | 10/2007 | Singh et al. ....................... 707/3 |
| 2008/0120292 A1 * | 5/2008 | Sundaresan et al. .............. 707/5 |
| 2008/0152231 A1 * | 6/2008 | Gokturk et al. ................ 382/209 |
| 2008/0232695 A1 * | 9/2008 | Noda et al. .................... 382/224 |
| 2009/0150337 A1 * | 6/2009 | Seide et al. ........................ 707/2 |
| 2010/0088295 A1 * | 4/2010 | Duan et al. .................... 707/705 |
| 2010/0303342 A1 * | 12/2010 | Berg et al. ..................... 382/155 |
| 2011/0218990 A1 * | 9/2011 | Jordahl ........................ 707/723 |

OTHER PUBLICATIONS

Liu et al., Large Graph Construction for Scalable Semi-Supervised Learning, Proceedings of the 27th International Conference on Machine Learning, 2010, pp. 1-8.*
Liu et al., Hashing with Graphs, Proceedings of the 28th International Conference on Machine Learning, 2011, pp. 1-8.*
Liu et al., Robust and Scalable Graph-Based Semisupervised Learning, Proceedings of the IEEE, vol. 100, No. 9, Jul. 9, 2012.*
ICLM 2010, the 27th International Conference on Machine Learning, Haifa, Israel, p. 1, available at http://www.icml2010.org/.*
Xu et al., Efficient Manifold Ranking of Image Retrieval, SIGIR'11, Jul. 2011, pp. 525-534.*
He et al.. Generalized Manifold-Ranking-Based Image Retrieval, IEEE Transactions on Image Processing, vol. 15, No. 10, Oct. 2006, pp. 3170-3177.*

(Continued)

*Primary Examiner* — Jayesh A Patel
(74) *Attorney, Agent, or Firm* — Hogan Lovells US LLP

(57) ABSTRACT

A method for searching in a large-scale database of images for images that are visually similar to query images is provided using a processor to perform the following steps: computing visual features for the database images; constructing an Image Anchor Graph that contains a plurality of anchors corresponding to a subset of images in the database, according to the computed visual features; computing visual features for the query images; and retrieving database images similar to one or more user query images using a ranking algorithm that uses the anchors in the Image Anchor Graph according to the computed visual features of both the query images and the database images on the Image Anchor Graph.

5 Claims, 4 Drawing Sheets

(56) References Cited

OTHER PUBLICATIONS

Liu et al.. Large Graph Construction for Scalable Semi-Supervised Learning, Proceedings of the 27th International Conference on Machine Learning, 2010, pp. 1-8.*

A. Oliva et al, Modeling the Shape of the Scene: A Holistic Representation of the Spatial Envelope, International Journal of Computer Vision 43(3), 145-175, 2001.

Y. Jing, VisualRank:Applying PageRank to Large-Scale Image Search, IEEE Transactions on Pattern Analsys and Machine Intelligene, vol. 30, No. 11, Nov. 2008, p. 1877-1890.

Wei Liu et al., Large Graph Construction for Scalable Semi-Supervised Learning, 27th International Conference on Machine Learning in Haifa, Israel (Jun. 2010) (entire document).

A. Oliva et al., Modeling the Shape of the Scene: A Holistic Representation of the Spatial Envelope, International Journal of Computer Vision, vol. 42, Issue 3, pp. 145-175, Kluwer Academic Publishers, Netherlands (2001).

J. Wang et al., Locality-constrained Linear Coding for Image Classification, Proceedings of the IEEE Computer Society Conference on Computer Vision and Pattern Recognition (CVPR), pp. 3360-3367 (Jun. 2010).

D. Zhou et al., Ranking on Data Manifolds, in Advances in Neural Information Processing Systems 16, pp. 169-176, MIT Press, Massachusetts USA (2004).

Y. Jing et al., VisualRank: Applying PageRank to Large-Scale Image Search, IEEE Transactions on Pattern Analysis and Machine Intelligence, vol. 30, Issue 11, pp. 1877-1890 (Nov. 2008).

* cited by examiner

METHOD FOR SEARCHING A DATABASE USING QUERY IMAGES AND AN IMAGE ANCHOR GRAPH-BASED RANKING ALGORITHM

FIELD OF THE INVENTION

The present invention generally relates to image search and retrieval, and in particular to a method for rapidly searching visually similar images in a large database collection of images using image anchors and graph-based ranking.

BACKGROUND OF THE INVENTION

Nowadays, image search has become an indispensable feature of web search engines, including GOGGLE, YAHOO!, BING, and ASK. However, most of these image search engines are not effective enough because image signals are too complicated to handle. Due to the remarkable success of text retrieval for searching web pages, these search engines return images solely based on the surrounding text associated with such images on the web pages. So far, no visual cue or image content is used during such a search process.

Since text-based image search yields unsatisfactory search results due to the difficulty in automatically associating the visual content of images with descriptive text, the current practice instead relies on analyzing visual similarities among the images. This general area is referred to as Content-Based Image Retrieval (CBIR), which has been actively studied for the past two decades. The key component of current CBIR systems deals with computing pairwise visual similarities between images from which a global ordering is derived by way of well-established ranking methods such as PageRank (see Y. Jing and S. Baluja, "VisualRank: Applying PageRank to large-scale image search," IEEE Transactions on Pattern Analysis and Machine Intelligence, volume 30, issue 11, pp. 1877-1890, 2008.) and Manifold Rank (see D. Zhou, J. Weston, A. Gretton, O. Bousquet, and B. Scholkopf, "Ranking on data manifolds," in Advances in Neural Information Processing Systems (NIPS), volume 16, 2004.). Unfortunately, at the web scale that involves tens of thousands to millions of images, pairwise similarity computation becomes prohibitively expensive in terms of both computer memory and time costs.

Fast nearest neighbor search is increasingly vital to many large-scale tasks such as image search, and existing state-of-the-art search techniques mainly focus on how to approximate the search results achieved by the Euclidean distance. Given the fact that low-dimensional intrinsic manifolds can exist among a massive number of images, it is more effective to search images along the underlying manifold structures. The manifold ranking method provides ranking scores to all training samples with respect to a particular query by leveraging a neighborhood graph to reveal the data manifolds. However, such a method cannot scale up to very large databases where a rapid and accurate search engine is required.

There is, therefore, a need to develop an efficient and effective ranking method to handle large-scale image search.

SUMMARY OF THE INVENTION

The present invention addresses the scalability issue plaguing manifold ranking by constructing a computationally tractable large graph called an Image Anchor Graph. It is employed in the present invention to enable scalable ranking for image retrieval with linear memory and time complexities. The present invention is represented by a method for searching in a large-scale database of images for images that are visually similar to query images, comprising using a processor for a) computing visual features for the database images;
b) constructing an Image Anchor Graph that contains a plurality of anchors corresponding to a subset of images in the database, according to the computed visual features;
c) computing visual features for the query images; and
d) retrieving database images similar to one or more user query images using a ranking algorithm that compares the computed visual features of both the query images and the database images through the Image Anchor Graph.

An advantage of the present invention is that it permits image search at a large scale (e.g., in databases which can have up to one million or more images), and simultaneously with high accuracy, short response time, and low computer memory usage.

DETAILED DESCRIPTION OF THE INVENTION

Figure 1:
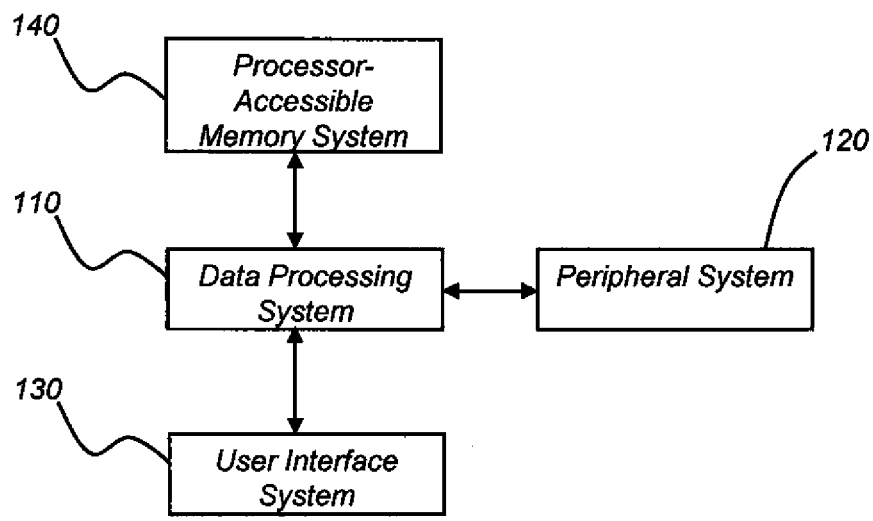
FIG. 1 is a pictorial representation of a processor.

FIG. 1 illustrates a system 100 for rapid image search in a large database according to an embodiment of the present invention. The system 100 includes a data processing system 110, a peripheral system 120, a user interface system 130, and a processor-accessible memory system 140. The processor-accessible memory system 140, the peripheral system 120, and the user interface system 130 are communicatively connected to the data processing system 110.

Figure 2:
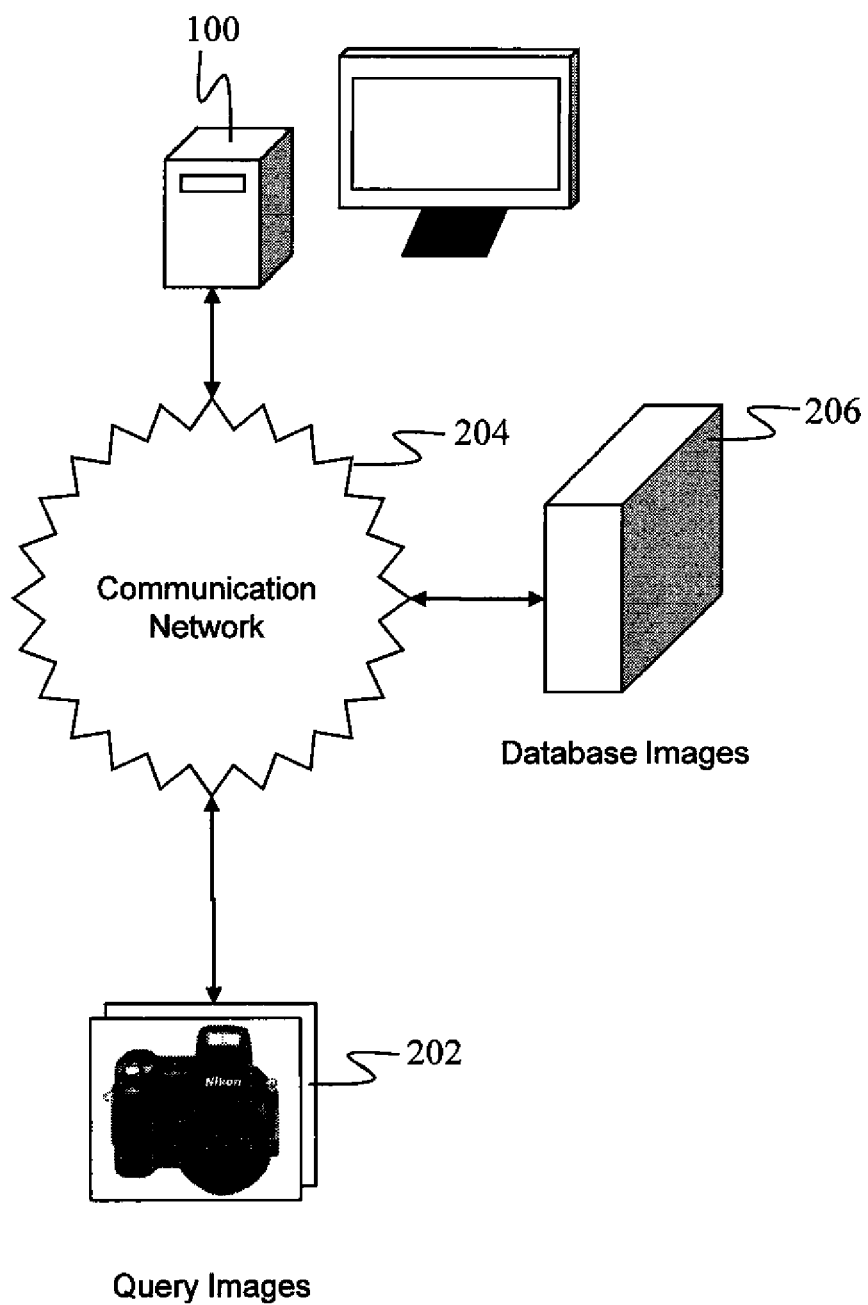
FIG. 2 is an overview of a system that makes use of the present invention.

The data processing system 110 includes one or more data processing devices that implement the processes of the various embodiments of the present invention, including the example process of FIG. 2. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device or component thereof for processing data, managing data, or handling data, whether implemented with electrical, magnetic, optical, biological components, or otherwise.

The processor-accessible memory system 140 includes one or more processor-accessible memories configured to store information, including the information needed to execute the processes of the various embodiments of the present invention. The processor-accessible memory system 140 is a distributed processor-accessible memory system including multiple processor-accessible memories communicatively connected to the data processing system 110 via a plurality of computers or devices. On the other hand, the processor-accessible memory system 140 need not be a distributed processor-accessible memory system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data is communicated. Further, the phrase "communicatively connected" is intended to include a connection between devices or programs within a single data processor, a connection between devices or programs located in different data processors, and a connection between devices not located in data processors at all. In this regard, although the processor-accessible memory system 140 is shown separately from the data processing system 110, one skilled in the art will appreciate that the processor-accessible memory system 140 can be stored completely or partially within the data processing system 110. Further in this regard, although the peripheral system 120 and the user interface system 130 are shown separately from the data processing system 110, one skilled in the art will appreciate that one or both of such systems can be stored completely or partially within the data processing system 110.

The peripheral system 120 can include one or more devices configured to provide digital images to the data processing system 110. For example, the peripheral system 120 can include digital video cameras, cellular phones, regular digital cameras, or other data processors. The data processing system 110, upon receipt of digital content records from a device in the peripheral system 120, can store such digital content records in the processor-accessible memory system 140.

The user interface system 130 can include a mouse, a keyboard, another computer, or any device or combination of devices from which data is input to the data processing system 110. In this regard, although the peripheral system 120 is shown separately from the user interface system 130, the peripheral system 120 is included as part of the user interface system 130.

The user interface system 130 also can include a display device, a processor-accessible memory, or any device or combination of devices to which data is output by the data processing system 110. In this regard, if the user interface system 130 includes a processor-accessible memory, such memory is part of the processor-accessible memory system 140 even though the user interface system 130 and the processor-accessible memory system 140 are shown separately in FIG. 1.

The present invention aims to build an automatic system using the above mentioned processor to address the problems of rapid image search in a large database mentioned in the background section. FIG. 2 presents an overview of a system that makes use of the present invention. One or more query image(s) 202 are typically supplied by a user (for example, using the user interface system 130 in FIG. 1). The query image is compared to a database of images 206, which are typically stored and accessible through a communication network 204. Using an embodiment of the present invention, the system 100 described earlier searches the database 206 and returns relevant or visually similar images to the user query images.

Figure 3:
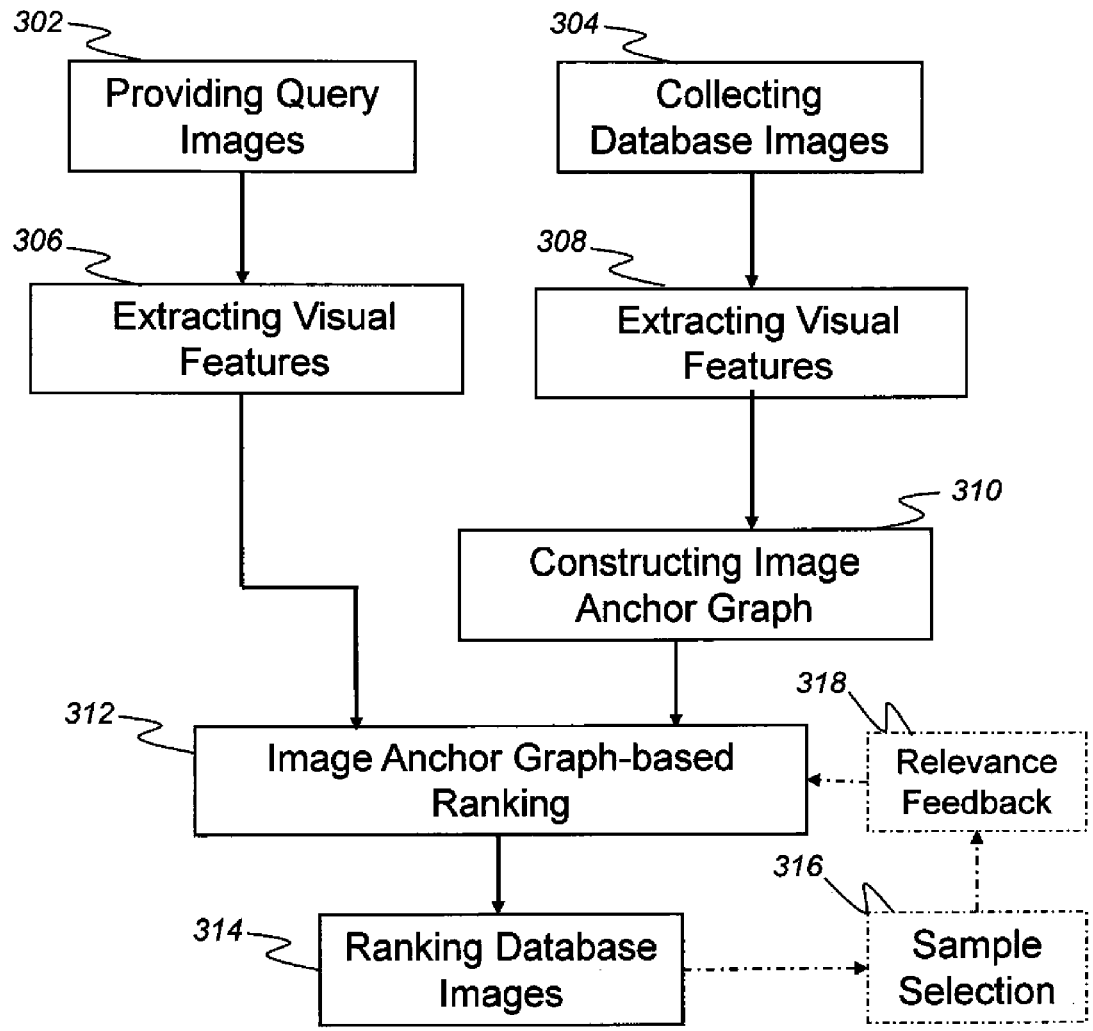
FIG. 3 is a flow chart for practicing an embodiment of the present invention.

FIG. 3 shows a flowchart of the present invention. For image search and retrieval, one or more user images need to be provided in step 302. To facilitate search by system 100, visual features need to be extracted from the query image(s) in step 306. On the other hand, a large-scale database of images is collected (e.g., from the web) and made available in step 304. To enable similarity comparison between a query images and database images, visual features also need to be extracted from the database images in step 308.

In one embodiment of the present invention, the visual features of an image are extracted from the pixel values of the image in either or both of the following forms:

LLC. Locality-constrained linear coding is one of the state-of-the-art appearance features for image classification. Details can be found in J. Wang, J. Yang, K. Yu, F. Lv, T. Huang, and Y. Gong, Locality-constrained linear coding for image classification, in the Proceedings of IEEE Computer Society Conference on Computer Vision and Pattern Recognition, 2010. This feature is fast and also fits a scalable linear similarity metric.

Gist. This feature is simple and captures the global shape characteristics of an image. Details can be found in A. Oliva and A. Torralba. Modeling the shape of the scene: a holistic representation of the spatial envelope, in International Journal of Computer Vision, Vol. 42(3): 145-175, 2001.

Before an image search is performed, the present invention pre-processes the database of images in order to enable a more rapid image search process later when a query image is presented. To that end, an Image Anchor Graph $G(X, U, Z)$ is constructed in step 310, where $X=\{x_1, x_2, \ldots x_n\}$ is the set of database images, $U=\{u_1, u_2, \ldots u_m\}$ is a small set of anchor images (m<<n, for example, m can be 500 when n is 1,000,000), and Z is an n×m matrix capturing data-to-anchor similarities.

The details of computing a general anchor graph are described in W. Liu, J. He, and S.-F. Chang, "Large Graph Construction for Scalable Semi-Supervised Learning," Proceedings of International Conference on Machine Learning (ICML), 2010. In the present invention, an Image Anchor Graph is constructed based on the extracted visual features of the database images using the methodology of a general anchor graph. Briefly summarized, in accordance with the present invention, a general Anchor Graph introduces a few anchor points, which are much fewer in number than the samples in a dataset yet collectively represent coarsely the entire dataset. This permits converting computationally expensive data-to-data similarity calculation to computationally much less expensive data-to-anchor similarity calculation. In one embodiment of the present invention, the anchor points spanning a dataset is determined by applying the commonly user K-means clustering algorithm on the dataset and selecting the resulted cluster centers as the anchor points. The Anchor Graph G is stored as m anchors and the associated critical sparse matrix Z in the computer memory, as a result of step 310. The sparse matrix Z is defined by Eq. (1).

$$Z_{ij} = \frac{\exp(-\|x_i - u_j\|^2/\sigma^2)}{\sum_{j' \in \langle i \rangle} \exp(-\|x_i - u_{j'}\|^2/\sigma^2)} \quad \forall j \in \langle i \rangle \quad (1)$$

where $\langle i \rangle$ is the index set containing s indexes in [1:m] corresponding to s closest anchors of image $x_i$. Then, the data-to-data similarity matrix W is such that $W_{ij}=\text{sim}(x_i,x_j)$, is derived by Eq. (2).

$$W=Z\mathsf{V}^{-1}Z^T, \text{ where } \mathsf{V}=\text{diag}(1^T Z). \quad (2)$$

It is not necessary to explicitly compute this n×n matrix W in memory. The subsequent computations are only based on the mathematical form of Eq. (2).

Still referring to FIG. 3, once the Image Anchor Graph is constructed for the database of images according to visual features of the database images using the method of constructing a general anchor graph, a ranking process is performed in step 312 for the given user query image using the constructed Image Anchor Graph. Any of the known ranking methods can be used in conjunction with the present invention, such as the previously mentioned Y. Jing and S. Baluja, and D. Zhou et al. The Image Anchor Graph-based ranking process produces a ranking function $f$ that minimizes the following cost function Eq. (3)

$$J(f)=(1-\alpha)\|f-y\|^2+\alpha f^T(I-S)f \quad (3)$$

where y is the relevancy indicator vector ($y_i=1$ if $x_i$ is the query or relevant to the query, $y_i=-1$ if $x_i$ is irrelevant to the query, and $y_i=0$ otherwise), $0<\alpha<1$ is the trade-off parameter, and S is the doubly-normalized data-to-data affinity matrix defined by Eq. (4).

$$S=(I-V)^{-1/2}(W-V)(I-V)^{-1/2} \quad (4)$$

where $$V = \text{diag}(V_{11}, V_{22}, \ldots, V_{nn}), V_{ii} = \sum_{j=1}^{m} Z_{ij}^2 / \Lambda_{jj}.$$

Through provable mathematical deductions from Eq. (3), the target ranking function $f$ with $x_{ij}$ being the query is solved as follows $$f(x_q)=\tilde{Z}Mz_q \quad (5)$$

where $$\tilde{Z}=(I-V)^{1/2}(I-(1-\alpha)V)^{-1}Z$$

$$M=[V/\alpha-Z^T(I-(1-\alpha)V)^{-1}Z]^{-1} \quad (6)$$

where $z_q$ is a bag-of-anchor vector representation for the query $x_q$ whose entries are defined by Eq. (7) (note that $z_q$ is also s-sparse, similar to each row in the matrix Z), $$z_{qj} = \frac{\exp(-\|x_q - u_j\|^2/\sigma^2)}{\sum_{j' \in \langle q \rangle} \exp(-\|x_q - u_{j'}\|^2/\sigma^2)} \quad \forall j \in \langle q \rangle \quad (7)$$

To produce the ranking function $f$, the Image Anchor Graph-based ranking system then stores the sparse n×m matrix $\tilde{Z}$ and dense m×m matrix M in the computer memory, and computes the bag-of-anchor vector $z_q$ according to any new query $x_q$.

Next in step 314, database images are ranked by sorting the ranking function values $f_i$ calculated in step 312 in a decreasing order. Upon the completion of this step, the top ranked images from the database are returned as retrieval results for the user query.

Optionally in the present invention, the relevance of the retrieved top ranked images are improved by a relevance feedback process in steps 316 and 318, which involve sample selection in step 316 and the actual relevance feedback in step 318. Relevance feedback is a commonly used strategy in image retrieval. The user can further specify the relevant or irrelevant images in the top ranked image list returned by the Image Anchor Graph-based ranking system. Let the index sets of the relevant and irrelevant database images be $<+>_q$ and $<->_q$ respectively. The re-ranking function $f$ incorporating such relevance feedback is updated by Eq. (8)

$$f(x_q, \text{feed}) = \tilde{Z}M\left(z_y + \sum_{i \in \langle + \rangle_q} z_i - \sum_{i \in \langle - \rangle_q} z_i\right) \quad (8)$$

where $z_i$ is the ith row vector in matrix Z.

Figure 4:
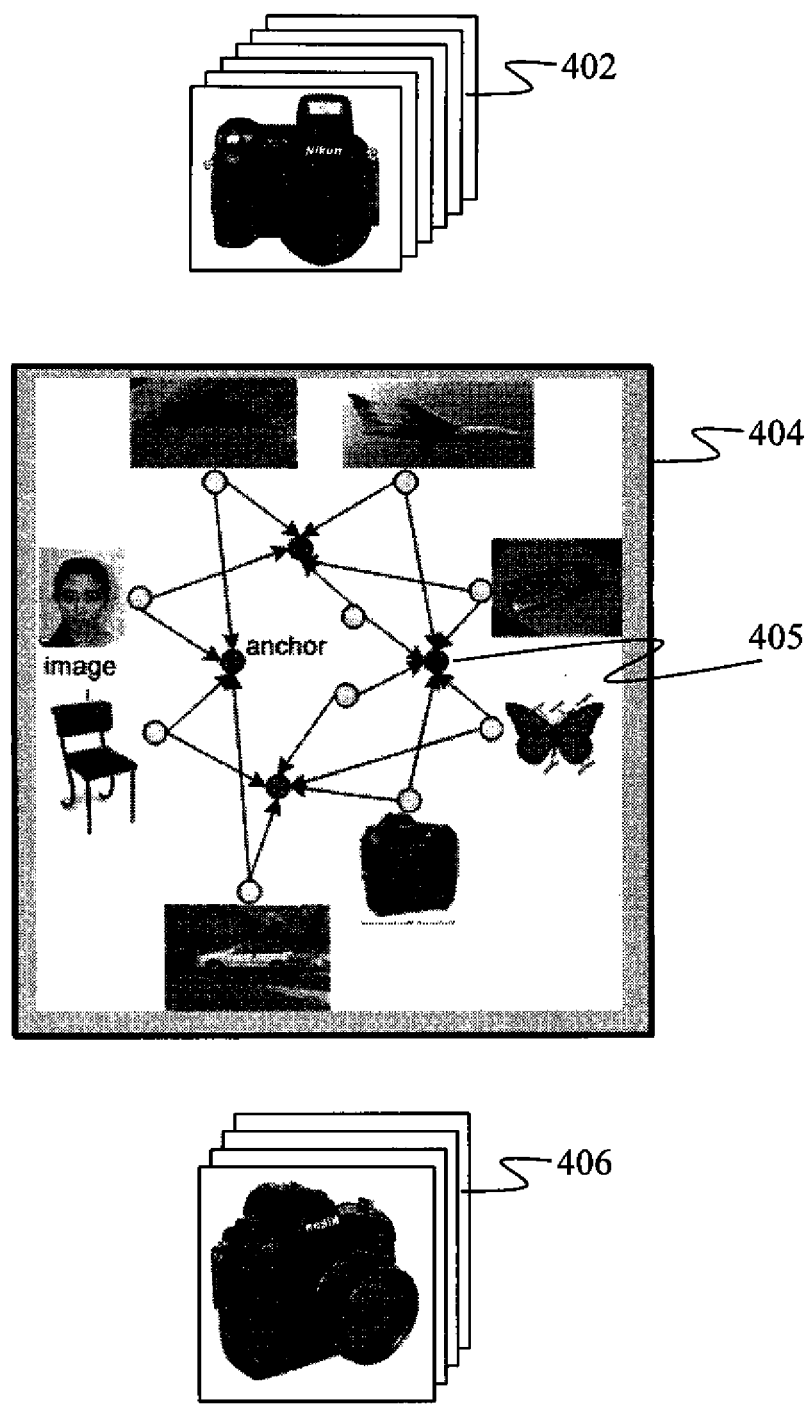
FIG. 4 is a pictorial illustration of user query images, an Image Anchor Graph built on database images, and retrieving images according to the present invention.

FIG. 4 is a pictorial illustration of user query images 402, an Image Anchor Graph 404 built on database images, and retrieved images 406 according to the present invention. In particular, a small number of anchors 405 are selected in the Image Anchor Graph 404, where each database image is associated with an anchor and such association is stored in a critical sparse matrix. As mentioned previously, the Image Anchor Graph 404 is stored as m anchors and the associated critical sparse matrix in the computer memory, as a result of step 310.

To sum up, the computer memory complexity of the inventive Image Anchor Graph-based rank algorithm is O(n) since one needs to store U, Z, $\tilde{Z}$ and M in main memory; the training time complexity of Image Anchor Graph-based ranking system is $O(m^2n)$ and the test time (querying) complexity is O(ns+n log n). All of these complexities are linear or nearly linear with the data scale n, therefore the present invention is capable of scaling well to databases which can be up to one million or more images.

Furthermore, to accomplish online search, in one embodiment of the present invention, the Image Anchor Graph-based image ranking process is further expedited via an inverted file structure, resulting in a sub-linear time complexity at the query time. The inverted file structure is a 2D indexing table, for which x axis corresponds to anchor ID and y axis corresponds to an image list storing image IDs of the database images linked to an anchor.

The various embodiments described above are provided by way of illustration only and should not be construed to limit the invention. Those skilled in the art will readily recognize various modifications and changes that can be made to the present invention without following the example embodiments and applications illustrated and described herein, and without departing from the true spirit and scope of the present invention, which is set forth in the following claims.

PARTS LIST

100 All elements of a processor
110 Data processing system
120 Peripheral system
130 User interface system
140 Processor-accessible memory system
202 User query images
204 Communication network
206 Database images
302 Providing query images step
304 Collecting database images step
306 Visual feature extraction step
308 Visual feature extraction step
310 Image Anchor Graph construction step
312 Image Anchor Graph-based ranking step
314 Ranking database images step
316 Sample selection step
318 Relevance feedback step
402 Examples of user's query images
404 Examples of database images and its Image Anchor Graph
405 An anchor
406 Examples of searched database images

The invention claimed is:

1. A method for searching a database for images that are visually similar to query images, comprising using a processor for
   a) extracting visual features from the images in the database;
   b) constructing an image anchor graph according to the visual features extracted from the images in the database, wherein the image anchor graph contains a plurality of anchor points corresponding to a subset of images in the database;
   c) extracting visual features from the query images;
   d) using an inverted file structure, wherein the inverted file structure is a 2D indexing table, for which x-axis corresponds to anchor ID and y-axis corresponds to an image list storing image IDs of images from the database linked to an anchor point; and
   e) retrieving images from the database that are similar to one or more query images using a ranking algorithm based on the image anchor graph that compares the visual features extracted from both the query images and the images in the database.

2. The method of claim 1 wherein the ranking algorithm of said step e) is a manifold ranking algorithm.

3. The method of claim 1, wherein said step b) includes performing K-means clustering on the visual features extracted from the images in the database to obtain a smaller number of anchor points than the number of images in the database, wherein each anchor point is a cluster center.

4. The method of claim 2, wherein the method further comprises using a processor for learning a ranking function for a query image.

5. The method of claim 2, further comprising using a processor for:
   f) presenting top ranked database images to a user;
   g) obtaining feedback from the user about semantic relevance of the top ranked images with respect to the query images;
   h) incorporating the user's feedback to re-rank the images in the database; and
   i) repeating said steps f) through h) until the user is satisfied.

* * * * *